US012607894B2

(12) United States Patent
Chen et al.

(10) Patent No.: US 12,607,894 B2
(45) Date of Patent: Apr. 21, 2026

(54) ELECTRICALLY CONTROLLED OPTICAL SCREEN

(71) Applicant: Coretronic Corporation, Hsin-Chu (TW)

(72) Inventors: Ping-Yen Chen, Hsin-Chu (TW); Wen-Chun Wang, Hsin-Chu (TW); Chung-Yang Fang, Hsin-Chu (TW); Jing-Yu Wu, Hsin-Chu (TW); Ching-Chuan Wei, Hsin-Chu (TW); Wei-Ting Wu, Hsin-Chu (TW); Tzu-Hung Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 401 days.

(21) Appl. No.: 18/340,885

(22) Filed: Jun. 25, 2023

(65) Prior Publication Data

US 2024/0036429 A1     Feb. 1, 2024

Related U.S. Application Data

(60) Provisional application No. 63/392,866, filed on Jul. 28, 2022.

(30) Foreign Application Priority Data

Sep. 26, 2022    (CN) .......................... 202211173446.5
May 5, 2023    (CN) .......................... 202310494189.3

(51) Int. Cl.
G02F 1/137         (2006.01)
G02F 1/1335         (2006.01)
(Continued)

(52) U.S. Cl.
CPC .... G02F 1/13718 (2013.01); G02F 1/133526 (2013.01); G02F 1/133531 (2021.01);
(Continued)

(58) Field of Classification Search
None
See application file for complete search history.

(56) References Cited

U.S. PATENT DOCUMENTS 5,731,886 A * 3/1998 Taber ................... G02B 5/3016
                                                      359/291
2009/0161044 A1* 6/2009 Ge ................... G02F 1/133555
                                                      349/98
(Continued)

FOREIGN PATENT DOCUMENTS

CN          2783219          5/2006
CN          113009769          6/2021
(Continued)

*Primary Examiner* — Ryan Crockett
(74) *Attorney, Agent, or Firm* — JCIPRNET

(57)          ABSTRACT

An electrically controlled optical screen including a switchable scattering element and an electrically controlled decorating module is provided. The switchable scattering element is disposed on a side of the electrically controlled decorating module and is configured to switch between a scattering state and a transparent state. The electrically controlled decorating module includes a first polarizer, a first quarter-wave plate, a cholesteric liquid crystal layer, an electrically controlled wave plate, a second quarter-wave plate and a second polarizer, which are sequentially stacked. The electrically controlled wave plate has a liquid crystal layer. The second polarizer is disposed between the switchable scattering element and the second quarter-wave plate.

19 Claims, 14 Drawing Sheets

(51) Int. Cl.

| | | |
|---|---|---|
| *G02F 1/13363* | (2006.01) | |
| *G02F 1/139* | (2006.01) | |
| *G03B 21/608* | (2014.01) | |
| *G03B 21/625* | (2014.01) | |

(52) U.S. Cl.
CPC .. *G02F 1/133536* (2013.01); *G02F 1/133555* (2013.01); *G02F 1/133607* (2021.01); *G02F 1/133634* (2013.01); *G02F 1/133636* (2013.01); *G02F 1/133638* (2021.01); *G02F 1/1393* (2013.01); *G03B 21/608* (2013.01); *G03B 21/625* (2013.01); *G02F 2413/02* (2013.01); *G02F 2413/15* (2013.01)

(56) References Cited

U.S. PATENT DOCUMENTS

| 2012/0194767 A1* | 8/2012 | Kaihoko | G02F 1/134363 |
| | | | 349/96 |
| 2020/0033693 A1* | 1/2020 | Lu | G02B 27/0093 |
| 2020/0159055 A1* | 5/2020 | Robinson | G02F 1/0311 |
| 2020/0257166 A1* | 8/2020 | Smith | G09G 3/3648 |
| 2021/0033898 A1* | 2/2021 | Woodgate | G02F 1/13471 |
| 2021/0173276 A1* | 6/2021 | Kim | B44C 5/08 |
| 2021/0223634 A1* | 7/2021 | Zhou | G02F 1/133531 |
| 2024/0168338 A1* | 5/2024 | Hai | G02F 1/133531 |

FOREIGN PATENT DOCUMENTS

| TW | I559071 | 11/2016 |
| TW | 202107181 | 2/2021 |

* cited by examiner

10A(10B,10C,10D,10E,10F,10G)

ELECTRICALLY CONTROLLED OPTICAL SCREEN

CROSS-REFERENCE TO RELATED APPLICATION

This application claims the priority benefit of U.S. provisional application Ser. No. 63/392,866, filed on Jul. 28, 2022, China application serial no. 202211173446.5, filed on Sep. 26, 2022, and China application serial no. 202310494189.3, filed on May 5, 2023. The entirety of the above-mentioned patent application is hereby incorporated by reference herein and made a part of this specification.

BACKGROUND

Technical Field

The invention relates to an optical device, and particularly relates to an electrically controlled optical screen.

Description of Related Art

A conventional projection device is to project an image light beam on a projection screen, and the image light beam is scattered by the projection screen to enter human eyes, so that the human eyes may see an image. The projection screen is not limited to a common projection screen, but may also be, for example, a glass showcase or an advertising board. In addition, the optical presentation on the projection screen may be achieved by an electrically controlled manner, specifically, it may be realized by an electrically controlled scattering element. The electrically controlled scattering element, for example, applies a polymer-dispersed liquid crystal (PDLC) technology, so that the electrically controlled scattering element may be switched between a scattering state and a transparent state. However, the electrically controlled scattering element cannot block light, and if a non-projection side thereof is in a bright environment, there will be a problem of poor image contrast.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an electrically controlled optical screen, which is equipped with an electrically controlled scattering element and an electrically controlled decorating module, the electrically controlled decorating module is adapted to shield light on a non-projection side of the electrically controlled scattering element, and image light projected onto the electrically controlled optical screen may produce an image with high contrast.

Other objects and advantages of the invention may be further illustrated by the technical features broadly embodied and described as follows.

In order to achieve one or a portion of or all of the objects or other objects, an embodiment of the invention provides an electrically controlled optical screen including a switchable scattering element and an electrically controlled decorating module. The electrically controlled optical screen is adapted to be switched between different optical modes. The switchable scattering element is disposed on one side of the electrically controlled decorating module and is configured to switch between a scattering state and a transparent state. The electrically controlled decorating module includes a first polarizer, a first quarter-wave plate, a cholesteric liquid crystal layer, an electrically controlled wave plate, a second quarter-wave plate and a second polarizer stacked in sequence. The electrically controlled wave plate has a liquid crystal layer. The second polarizer is disposed between the switchable scattering element and the second quarter-wave plate. The cholesteric liquid crystal layer is configured to reflect one of left-handed circularly polarized light or right-handed circularly polarized light. A light absorption axis of the first polarizer is perpendicular to a light absorption axis of the second polarizer, and an optical axis of the first quarter-wave plate is parallel to an optical axis of the second quarter-wave plate, or the light absorption axis of the first polarizer is parallel to the light absorption axis of the second polarizer, and the optical axis of the first quarter-wave plate is perpendicular to the optical axis of the second quarter-wave plate.

An embodiment of the invention provides an electrically controlled optical screen including a scattering element and an electrically controlled decorating module. The electrically controlled optical screen is adapted to be switched between different optical modes. The scattering element is disposed on one side of the electrically controlled decorating module. The electrically controlled decorating module includes a first polarizer, a first quarter-wave plate, a cholesteric liquid crystal layer, an electrically controlled wave plate, a second quarter-wave plate and a second polarizer stacked in sequence. The first polarizer is disposed between the scattering element and the first quarter-wave plate. The cholesteric liquid crystal layer is configured to reflect one of left-handed circularly polarized light or right-handed circularly polarized light. A light absorption axis of the first polarizer is perpendicular to a light absorption axis of the second polarizer, and an optical axis of the first quarter-wave plate is parallel to an optical axis of the second quarter-wave plate, or the light absorption axis of the first polarizer is parallel to the light absorption axis of the second polarizer, and the optical axis of the first quarter-wave plate is perpendicular to the optical axis of the second quarter-wave plate.

Based on the above description, the electrically controlled optical screen provided by the embodiment of the invention has the switchable scattering element and the electrically controlled decorating module, and is suitable for switching between different optical modes. More specifically, the switchable scattering element may be switched between the scattering state and the transparent state, and may be combined with the electrically controlled wave plate in the electrically controlled decorating module to generate various optical modes. The various optical modes provide users with different visual experiences.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
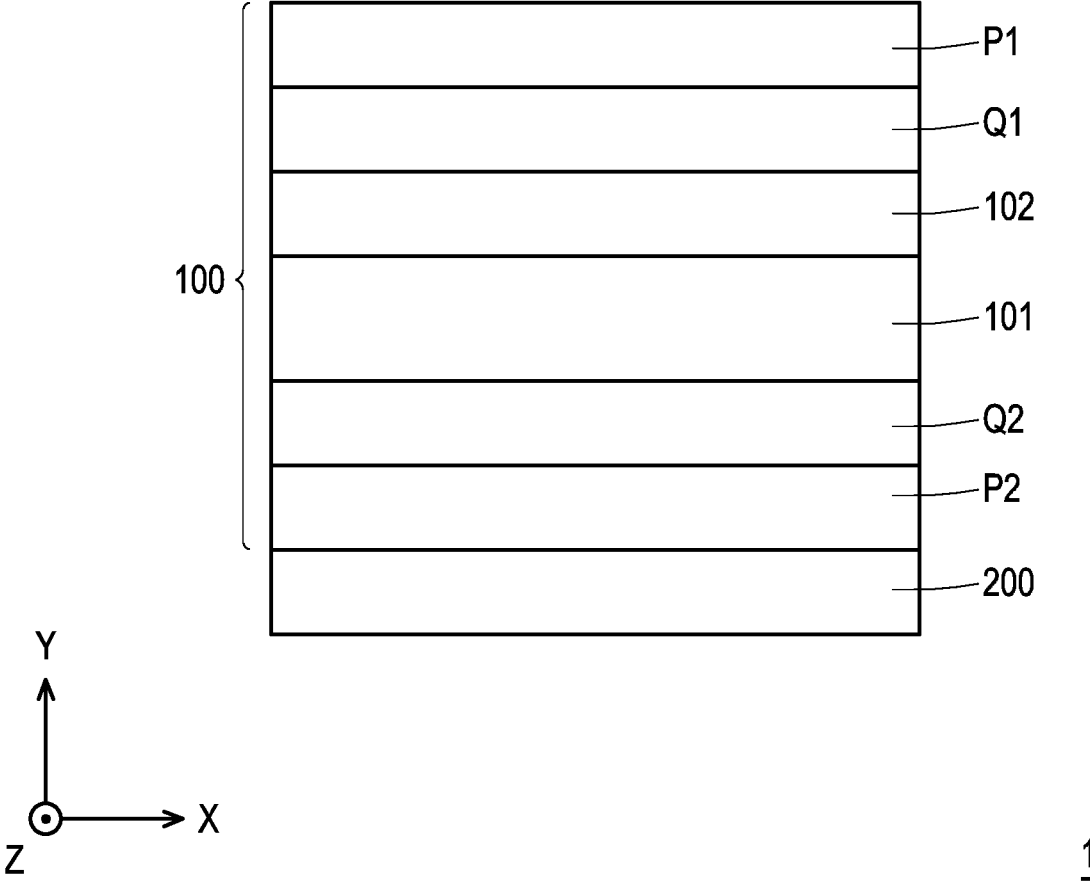
FIG. 1 is a schematic diagram of an electrically controlled optical screen according to an embodiment of the invention.

Referring to FIG. 1, FIG. 1 is a schematic diagram of an electrically controlled optical screen according to an embodiment of the invention. An electrically controlled optical screen 10A includes a switchable scattering element 200 and an electrically controlled decorating module 100. The switchable scattering element 200 is disposed on one side of the electrically controlled decorating module 100, and this side is a projection side of the electrically controlled optical screen 10A for receiving an image light beam. The switchable scattering element 200 may be controlled to switch between a scattering state and a transparent state. The electrically controlled decorating module 100 includes a first polarizer P1, a first quarter-wave plate Q1, a cholesteric liquid crystal layer 102, an electrically controlled wave plate 101, a second quarter-wave plate Q2 and a second polarizer P2 stacked in sequence. The electrically controlled wave plate 101 has a liquid crystal layer. The second polarizer P2 is disposed between the switchable scattering element 200 and the second quarter-wave plate Q2. A light absorption axis of the first polarizer P1 is perpendicular to a light absorption axis of the second polarizer P2. In the embodiment, the light absorption axis of the first polarizer P1 is parallel to an X direction, and the light absorption axis of the second polarizer P2 is parallel to a Z direction. An optical axis of the first quarter-wave plate Q1 is parallel to an optical axis of the second quarter-wave plate Q2. The cholesteric liquid crystal layer 102 is used to reflect one of left-handed circularly polarized light or right-handed circularly polarized light.

The first quarter-wave plate Q1 and the second quarter-wave plate Q2 may be, for example, made of materials having a normal wavelength dispersion characteristic or an inverse wavelength dispersion characteristic, preferably made of materials having the inverse dispersion characteristic. The cholesteric liquid crystal layer 102 has cholesteric liquid crystal and may have a decorative pattern, such as wood grain. Specifically, the cholesteric liquid crystal means liquid crystal molecules with characteristics of Bragg reflection and bistability, which may reflect incident light having wavelength about the helical pitch of the liquid crystal molecules and having the same rotation direction with the liquid crystal molecules, and may be switched to two stable states, which are a planar state and a focal-conic state, when driven by an external electric field. The cholesteric liquid crystal may reflect light of a specific wavelength under the planar state, so that a corresponding decorative pattern may be presented. Alternatively, light may pass through the cholesteric liquid crystal under the focal conic state, and no decorative pattern may be presented. For the convenience of understanding, in the embodiments described in FIG. 1 to FIG. 9 of the invention, the cholesteric liquid crystal layer 102 is set to reflect the left-handed circularly polarized light, while the right-handed circularly polarized light may pass through the cholesteric liquid crystal layer 102.

In some embodiments, the switchable scattering element 200 includes a liquid crystal layer. Liquid crystal molecules in the liquid crystal layer are, for example, polymer-dispersed liquid crystal (PDLC), polymer network liquid crystal (PNLC), or multi-stable liquid crystal (MSLC), and the switchable scattering element 200 may be switched between a scattering state (a fog state) and a transparent state.

The electrically controlled wave plate 101 may be a liquid crystal cell using a vertical alignment (VA) technology, an electrically controlled birefringence (ECB) technology or an in-plane switching (IPS) technology. Taking the embodiment of using the vertical alignment (VA) technology as an example for description, the electrically controlled wave plate 101 may be switched between a first state and a second state through an operation of applying voltage or not applying voltage. The electrically controlled wave plate 101 acts as a half wave plate in the first state, and provides no phase delay in the second state. Based on the structure and technology of the above-mentioned switchable scattering element 200 and the electrically controlled wave plate 101, the electrically controlled optical screen 10A may be switched between different optical modes to be described below. The electrically controlled optical screen 10A may be, for example, switched among a projection mode, a decoration mode, a transparent mode and a lighting mode, which will be described in detail below.

Figure 2A:
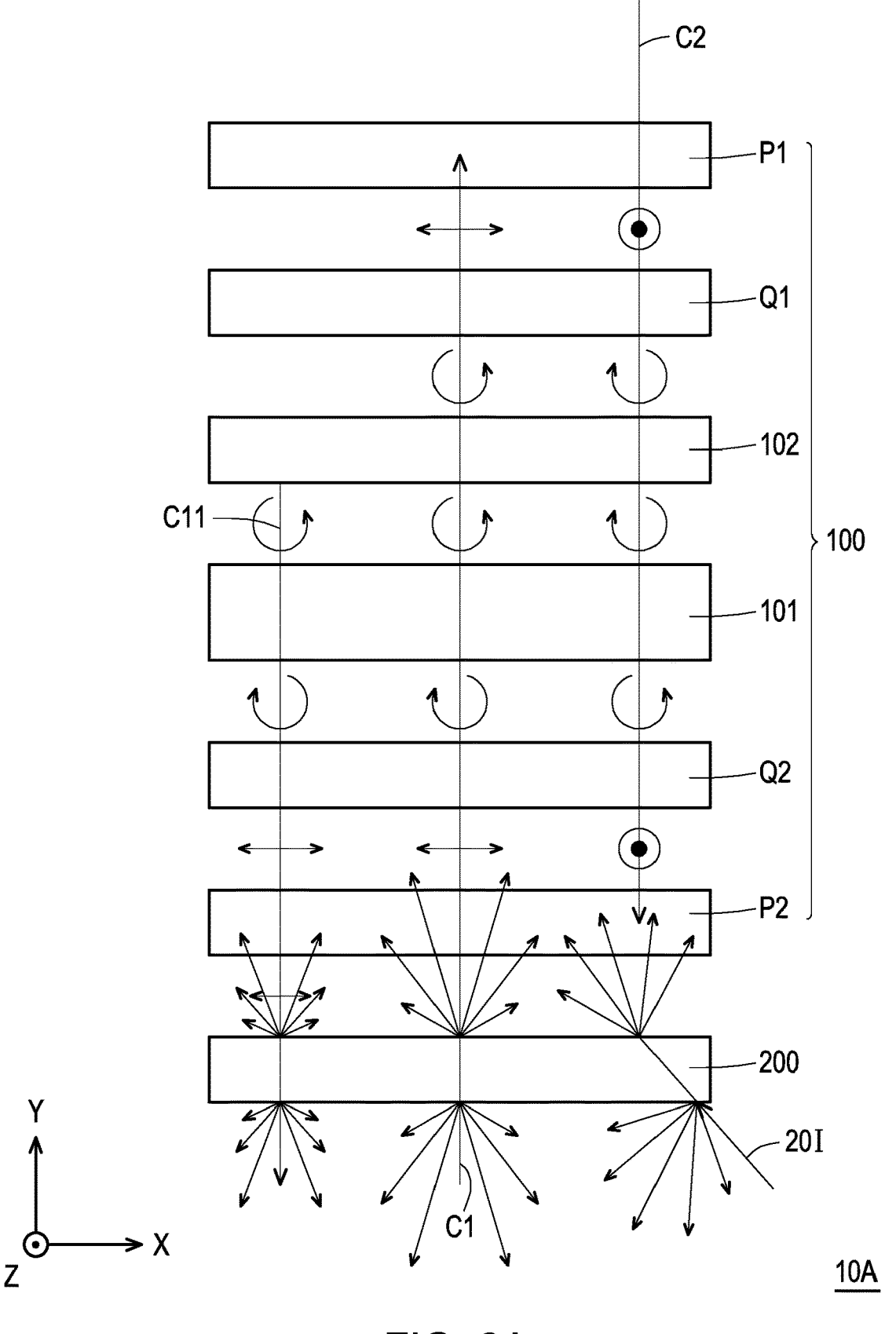
FIG. 2A is a schematic diagram of an optical mechanism of the electrically controlled optical screen in a projection mode according to an embodiment of the invention.
Figure 2B:
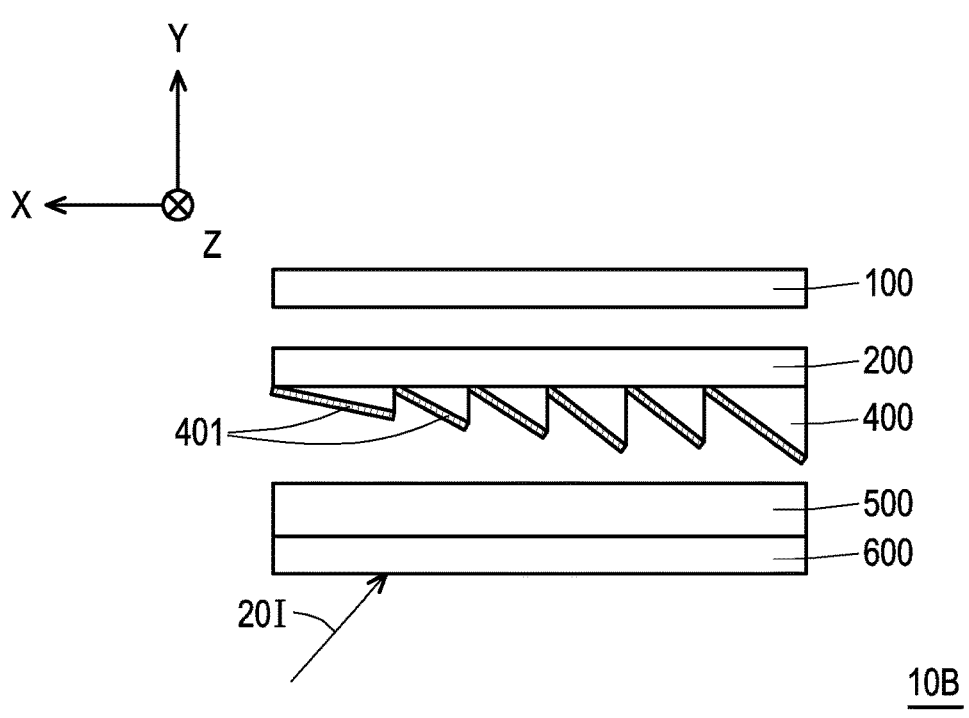
FIG. 2B is a schematic diagram of an electrically controlled optical screen according to an embodiment of the invention.
Figure 2C:
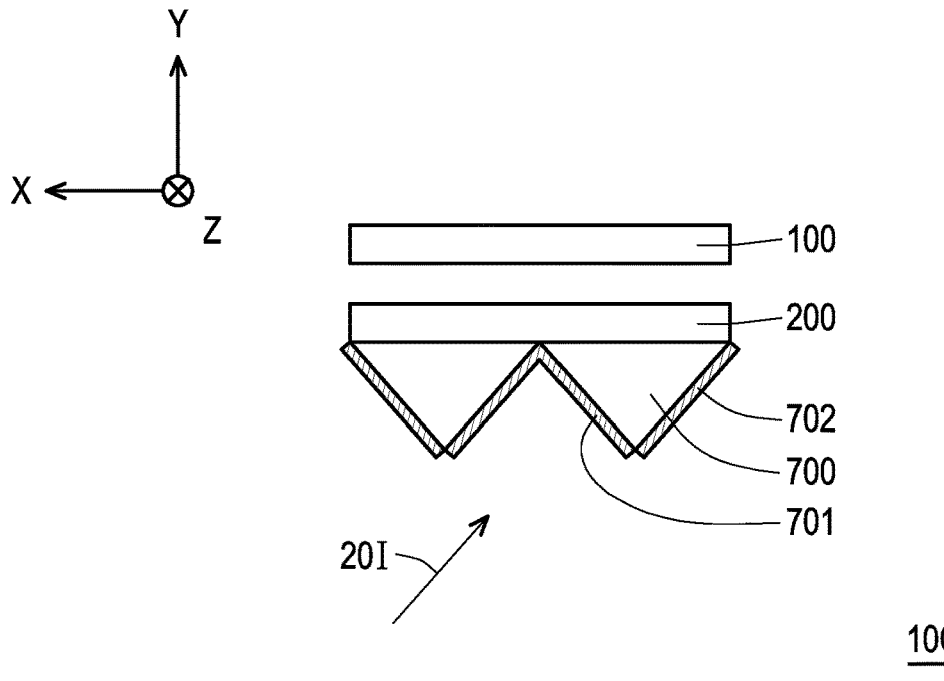
FIG. 2C is a schematic diagram of an electrically controlled optical screen according to an embodiment of the invention.
Figure 2D:
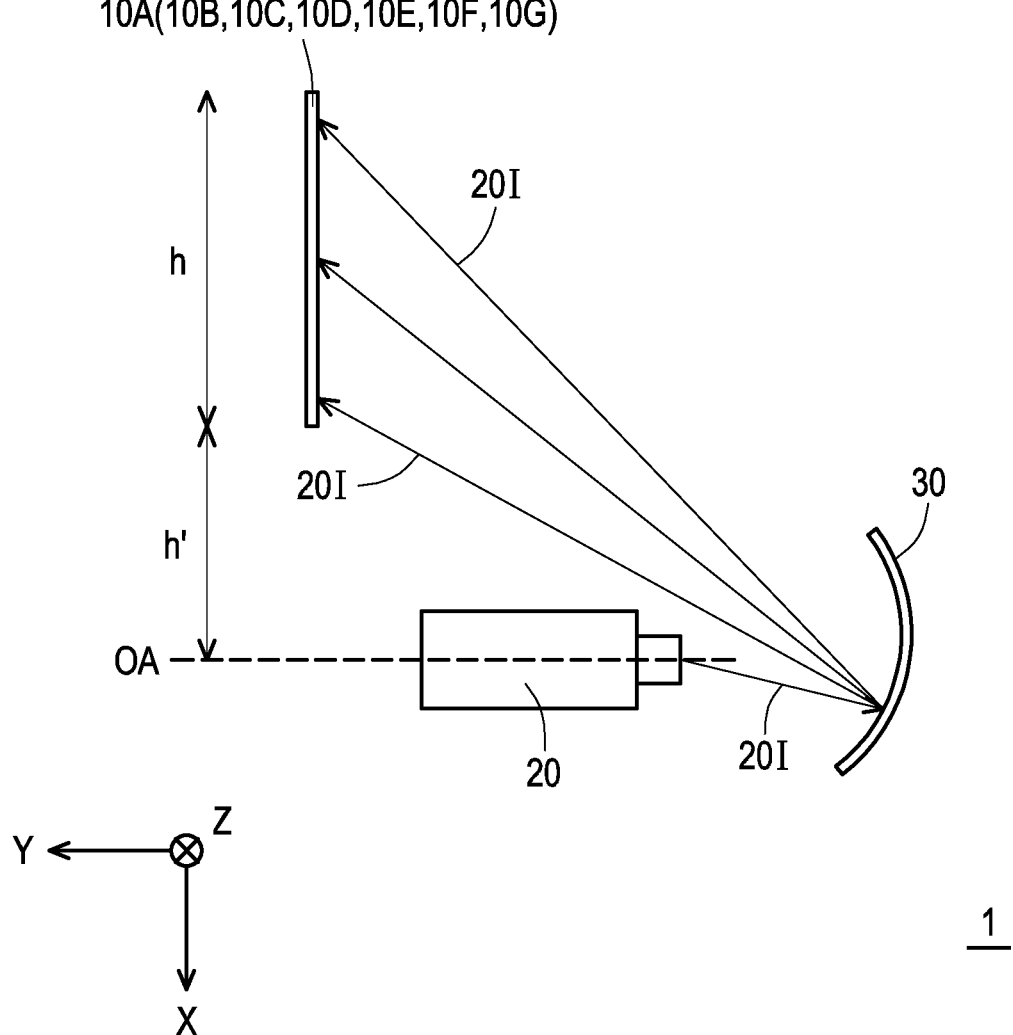
FIG. 2D is a schematic diagram of a projection device according to an embodiment of the invention.

Referring to FIG. 1, FIG. 2A and FIG. 2D at the same time, FIG. 2D is a schematic diagram of a projection device according to some embodiments of the invention, and FIG. 2A is a schematic diagram of an optical mechanism of the electrically controlled optical screen 10A of FIG. 1 in the projection mode. In the embodiment, a projection system 1 includes the electrically controlled optical screen 10A, a projection device 20 and a reflector 30. The projection device 20 is used for providing image light 201. After the image light 201 projected from the projection device 20 is reflected by the reflector 30, the image light 201 is projected on the electrically controlled optical screen 10A. In the embodiment, the projection device 20 and the electrically controlled optical screen 10A are disposed on a same side of the reflector 30, and the image light 201 is incident on the electrically controlled optical screen 10A from a projection side of the electrically controlled optical screen 10A. The reflector 30 may be, for example, a reflector independently arranged or a reflector disposed within a same casing as the projection device.

In various embodiments of the invention, the image light 201 is configured to be obliquely incident on the electrically controlled optical screen 10A (or on the electrically controlled optical screen 10B to the electrically controlled optical screen 10E that will be described in other embodiments), as shown in FIG. 2D shown. Specifically, after the image light 201 exits the projection device 20, it is reflected to the electrically controlled optical screen 10A by the reflector 30. Regarding the projection device 20 and the image light 201 propagating between the reflector 30 and the electrically controlled optical screen 10A, a gap determined by an offset is present there between. If the offset is too small, the image light 201 may interfere with a lens of the projection device 20, where the offset is (h+h')×100%/h, where h' is a vertical distance between a lower edge of a projected image on the electrically controlled optical screen 10A and an extending line of an optical axis OA of the projection device 20, and h is a length of the projected image on the electrically controlled optical screen 10A in a direction perpendicular to the extending line of the optical axis OA. Preferably, the above offset should be greater than or equal to 120%.

In the embodiment, when the electrically controlled optical screen 10A is switched to the projection mode, the switchable scattering element 200 disposed on the projection side of the electrically controlled optical screen 10A is configured as a scattering state, and the electrically controlled wave plate 101 is configured as a half-wave plate.

When the image light 201 from the projection device 20 is incident to the switchable scattering element 200 from the projection side of the electrically controlled optical screen 10A, a part of the image light 201 may be reflected and scattered to form a projected image seen by human eyes located at the projection side. Another part of the image light 201 is transmitted and scattered, and then sequentially passes through the second polarizer P2, the second quarter-wave plate Q2, the electrically controlled wave plate 101, and the cholesteric liquid crystal layer 102. Since most of this part of the image light 201 is obliquely incident on the cholesteric liquid crystal layer 102, and for the image light obliquely incident on the cholesteric liquid crystal layer 102, a reflection spectrum of the cholesteric liquid crystal layer 102 is shifted towards short wavelength (i.e., a blue waveband), resulting in great decrease of reflectivity thereof, so that most of the light may pass through the cholesteric liquid crystal layer 102 and is absorbed by the first polarizer P1.

Then, an influence of the electrically controlled optical screen 10A on ambient light C1 from the projection side of the electrically controlled optical screen 10A and ambient light C2 from a non-projection side of the electrically controlled optical screen is described in detail below, where the projection side of the electrically controlled optical screen 10A is a side where the electrically controlled optical screen 10A receives the image light, and the non-projection side of the electrically controlled optical screen is the other side opposite to the projection side.

The electrically controlled optical screen 10A is in the projection mode, the ambient light C1 from the projection side is propagated toward the switchable scattering element 200, and a part of the ambient light C1 penetrates through the switchable scattering element 200 and is scattered by the switchable scattering element 200. Another part of the ambient light C1 may be scattered and reflected by the surface of the switchable scattering element 200, where the part of the ambient light C1 penetrating through the switchable scattering element 200 is formed into linear polarized light of the X direction after passing through the second polarizer P2. After passing through the second quarter-wave plate Q2, the ambient light C1 is formed into right-handed circularly polarized light, and after passing through the electrically controlled wave plate 101 (configured as a half-wave plate), the ambient light C1 is formed into left-handed circularly polarized light C1. When the left-handed circularly polarized light C1 is incident to the cholesteric liquid crystal layer 102, a part of it may be reflected by the cholesteric liquid crystal layer 102 to form ambient light C11, while the other part of the left-handed circularly polarized light C1 may penetrate through the cholesteric liquid crystal layer 102 as a wavelength thereof is deviated from a dominant wavelength corresponding to the cholesteric liquid crystal molecules. After passing through the first quarter-wave plate Q1, the ambient light C1 passing through the cholesteric liquid crystal layer 102 is formed into linear polarized light of the X direction, and is absorbed by the first polarizer P1.

After being reflected by the cholesteric liquid crystal layer 102, the ambient light C11 is formed into right-handed circularly polarized light C11 after passing through the electrically controlled wave plate 101 (configured as a half-wave plate). After passing through the second quarter-wave plate Q2, the ambient light C11 reflected by the cholesteric liquid crystal layer 102 is formed into linear polarized light of the X direction and passes through the second polarizer P2. Finally, the ambient light C11 is scattered by the switchable scattering element 200. At this time, a brightness of the ambient light C11 is much lower than an initial brightness of the ambient light C1.

The ambient light C2 from the non-projection side is formed into linear polarized light of the Z direction after passing through the first polarizer P1. After passing through the first quarter-wave plate Q1, the linear polarized light is formed into right-handed circularly polarized light C2 and is adapted to pass through the cholesteric liquid crystal layer 102. The right-handed circularly polarized light C2 is formed into left-handed circularly polarized light after passing through the electrically controlled wave plate 101 (configured as a half-wave plate). After passing through the second quarter-wave plate Q2, the ambient light C2 is formed into linear polarized light of the Z direction and absorbed by the second polarizer P2. Therefore, the ambient light C2 cannot pass through the electrically controlled optical screen 10A, and the influence of the ambient light C2 from the non-projection side upon the image quality of projection is greatly reduced.

Based on the above description, when the electrically controlled optical screen is switched to the projection mode, the switchable scattering element 200 is configured as the scattering state, and the electrically controlled wave plate 101 is configured as a half-wave plate, so that the electrically controlled optical screen 10A may largely avoid the influence of the ambient light C2 from the non-projection side and the ambient light C1 from the projection side upon the image quality of projection.

In order to fully describe various implementation aspects of the invention, other embodiments of the invention will be described below. It should be noted here that the following embodiments use the component referential numbers and a part of the content of the previous embodiments, where the same referential numbers are used to denote the same or similar components, and descriptions of the same technical content are omitted. For the description of the omitted parts, reference may be made to the aforementioned embodiments, and details thereof are not repeated in the following embodiments.

Referring to FIG. 1, FIG. 2B and FIG. 2D, FIG. 2B is a schematic diagram of an electrically controlled optical screen according to an embodiment of the invention. In the embodiment, the projection system 1 includes an electrically controlled optical screen the projection device 20 and the reflector 30, where the reflector 30 may be, for example, an independently arranged reflector or a reflector disposed within a same casing as the projection device 20. The projection device 20 is used for providing the image light 201. After being reflected by the reflector 30, the image light 201 is projected onto the electrically controlled optical screen 10B from the projection side of the electrically controlled optical screen 10B.

In the embodiment, the electrically controlled optical screen 10B is different from the electrically controlled optical screen 10A in that the electrically controlled optical screen 10B further includes a Fresnel lens layer 400, and the Fresnel lens layer 400 is coated with a transflective layer 401, where the transflective layer 401 is, for example, coated on at least a part of a surface of the Fresnel lens layer 400 away from the switchable scattering element 200. The image light 201 is reflected by the transflective layer 401 and enters human eyes, thereby improving a visible brightness and contrast. In an embodiment, the transflective layer 401 may be replaced by a reflective layer with higher reflectivity.

In another embodiment, the electrically controlled optical screen 10B further includes a hard surface layer 600 and a diffusion layer 500, and the diffusion layer 500 is, for example, disposed between the hard surface layer 600 and the Fresnel lens layer 400. After the image light 201 passes through the hard surface layer 600 and the diffusion layer 500, at least a part of the image light 201 is reflected by the transflective layer 401, and sequentially penetrates through the diffusion layer 500 and the hard surface layer 600 to enter the human eyes. The switchable scattering element 200 may be used as a substrate, and is used to diffuse and reflect the other part of the image light 201 passing through the transflective layer 401 and the Fresnel lens layer 400, so as to avoid glare. The hard surface layer 600 is used to protect the electrically controlled optical screen 10B, has an anti-scratch function, and may be made of transparent glass or plastic.

Referring to FIG. 1, FIG. 2C and FIG. 2D at the same time, FIG. 2C is a schematic diagram of an electrically controlled optical screen according to an embodiment of the invention. In the embodiment, the projection system 1 includes an electrically controlled optical screen 10C, the projection device 20 and the reflector 30, where the reflector 30 may be, for example, an independently arranged reflector or a reflector disposed within a same casing as the projection device 20. The projection device is used for providing the image light 201. After being reflected by the reflector 30, the image light 201 is projected onto the electrically controlled optical screen 10C from the projection side.

In the embodiment, a difference between the electrically controlled optical screen 10C and the electrically controlled optical screen 10A is that the electrically controlled optical screen 10C further includes a prism layer 700, where the prism layer 700 includes a plurality of prism structures arranged along the X direction, and a reflective layer 701 and a light absorbing layer 702 are respectively coated on surfaces of each prism structure of the prism layer 700 away from the switchable scattering element, and the reflective layer 701 and the light absorbing layer 702 are arranged in alternation. The reflective layer 701 is disposed on a light-receiving surface of each of the prism structures of the prism layer 700.

The image light 201 is reflected by the reflective layer 701 on the light-receiving surface of the prism structure and enters the human eyes, thereby improving the visual brightness and contrast of the image light 201. The ambient light may be absorbed by the light absorbing layer 702 on the prism structure to improve a contrast of the image. The switchable scattering element 200 is used as the substrate and scatters and reflects a small part of the image light 201 penetrating through the prism layer 700.

Figure 3:
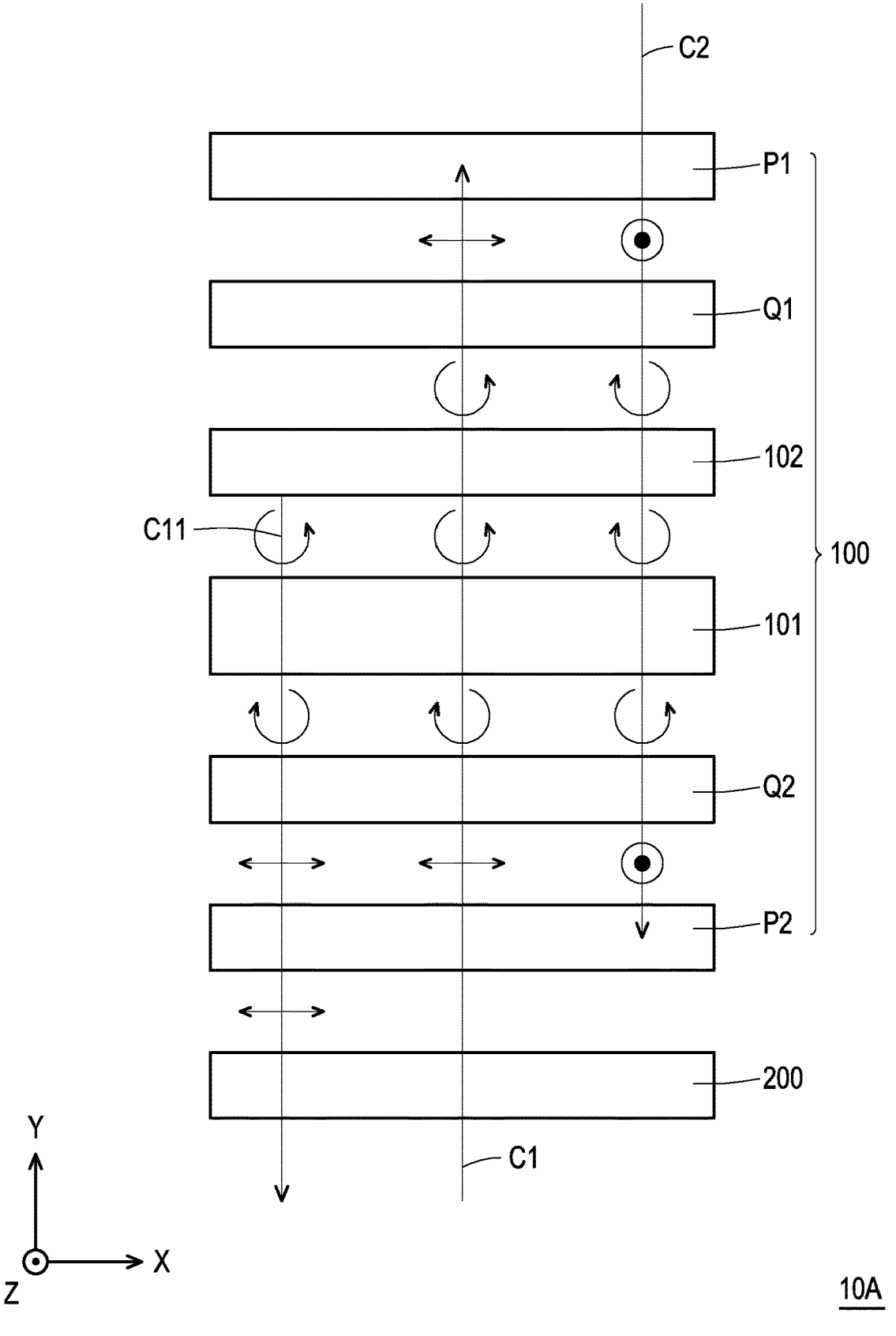
FIG. 3 is a schematic diagram of an optical mechanism of the electrically controlled optical screen in a decoration mode according to an embodiment of the invention.

Referring to FIG. 1 and FIG. 3 at the same time, FIG. 3 is a schematic diagram of an optical mechanism of the electrically controlled optical screen 10A of FIG. 1 in the decoration mode.

In the embodiment, when the electrically controlled optical screen 10A is switched to the decoration mode, the switchable scattering element 200 is switched to the transparent state, and the electrically controlled wave plate 101 is configured as a half-wave plate (the state of the half-wave plate).

The ambient light C2 from the non-projection side of the electrically controlled optical screen 10A is formed into linear polarized light of the Z direction after penetrating through the first polarizer P1. After passing through the first quarter-wave plate Q1, the linear polarized light is formed into right-handed circularly polarized light C2 and is adapted to pass through the cholesteric liquid crystal layer 102. The right-handed circularly polarized light C2 is formed into left-handed circularly polarized light after passing through the electrically controlled wave plate 101 (configured as a half-wave plate). After passing through the second quarter-wave plate Q2, the ambient light C2 is formed into linear polarized light of the Z direction and is absorbed by the second polarizer P2.

The ambient light C1 from the projection side of the electrically controlled optical screen 10A is propagated toward the switchable scattering element 200, and the ambient light C1 may penetrate through the switchable scattering element 200, and is formed into linear polarized light of the X direction after passing through the second polarizer P2. After passing through the second quarter-wave plate Q2, the ambient light C1 is formed into right-handed circularly polarized light, and after passing through the electrically controlled wave plate 101 (configured as a half-wave plate), the ambient light C1 is formed into left-handed circularly polarized light C1. When the left-handed circularly polarized light C1 is incident to the cholesteric liquid crystal layer 102, a part of the left-handed circularly polarized light C1 is reflected by the cholesteric liquid crystal layer 102 to form ambient light C11, while the other part of the left-handed circularly polarized light C1 penetrates through the cholesteric liquid crystal layer 102 as a wavelength thereof is deviated from a dominant wavelength corresponding to the cholesteric liquid crystal molecules. After passing through the first quarter-wave plate Q1, the ambient light C1 passing through the cholesteric liquid crystal layer 102 is formed into linear polarized light of the X direction, and is absorbed by the first polarizer P1.

After being reflected by the cholesteric liquid crystal layer 102, the ambient light C11 is formed into right-handed circularly polarized light C11 after passing through the electrically controlled wave plate 101 (configured as a half-wave plate). After passing through the second quarter-wave plate Q2, the ambient light C11 is formed into linear polarized light of the X direction and passes through the second polarizer P2. In the end, the ambient light C11 passes through the switchable scattering element 200 of the transparent state, and human eyes may see the decorative pattern (such as wood grain) of the cholesteric liquid crystal layer 102.

Figure 4:
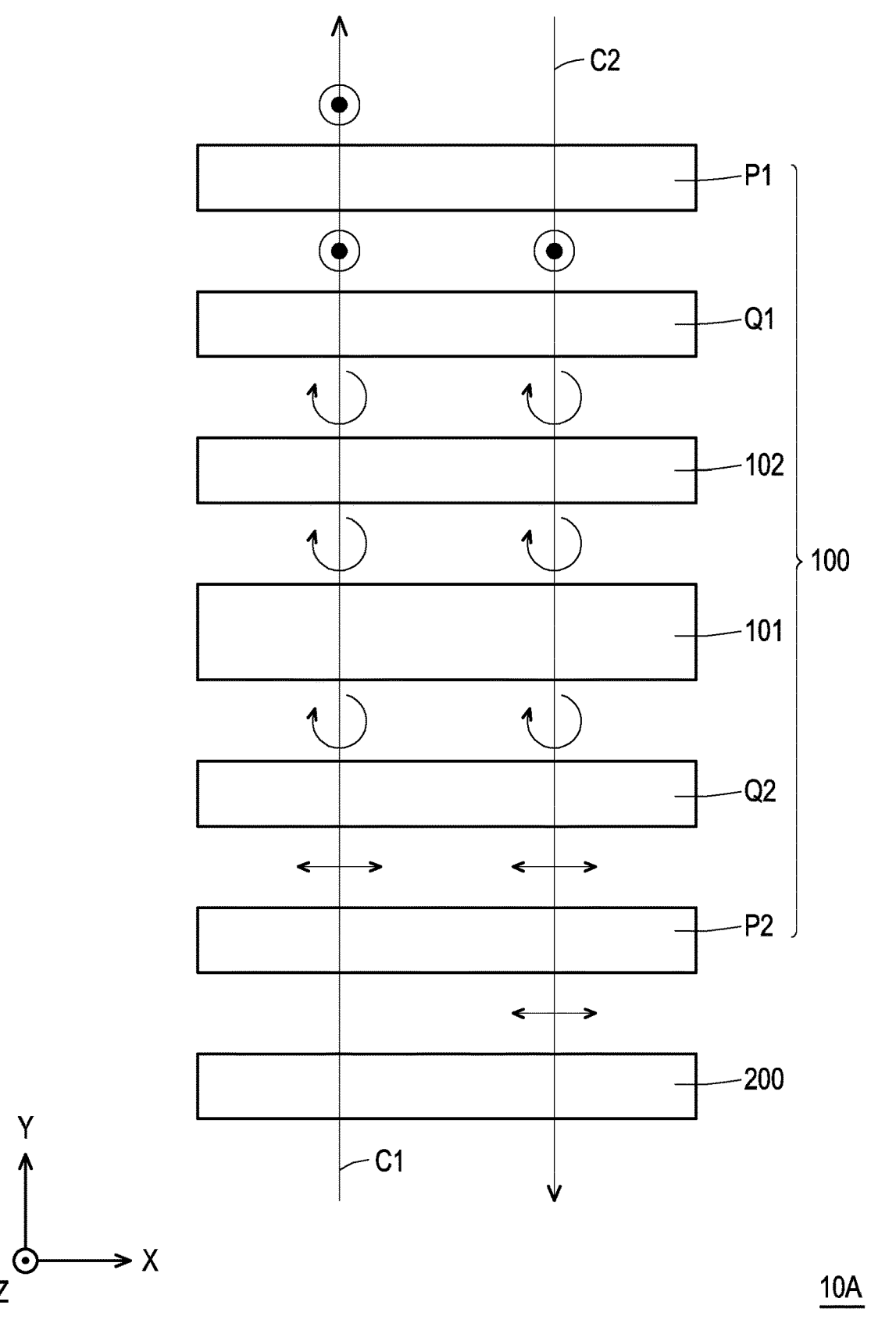
FIG. 4 is a schematic diagram of an optical mechanism of the electrically controlled optical screen in a transparent mode according to an embodiment of the invention.

Referring to FIG. 1 and FIG. 4 at the same time, FIG. 4 is a schematic diagram of an optical mechanism of the electrically controlled optical screen 10A of FIG. 1 in the transparent mode.

In the embodiment, the electrically controlled optical screen 10A is switched to the transparent mode, where the switchable scattering element 200 is configured to the transparent state, and the electrically controlled wave plate 101 is configured to a state, in which no phase delay is provided.

The ambient light C2 from the non-projection side of the electrically controlled optical screen 10A is formed into linear polarized light of the Z direction after penetrating through the first polarizing layer P1. After passing through the first quarter-wave plate Q1, it is formed into right-handed circularly polarized light C2 and is adapted to pass through the cholesteric liquid crystal layer 102. The right-handed circularly polarized light C2 is still right-handed circularly polarized light after passing through the electrically controlled wave plate 101 (without the phase delay function). After passing through the second quarter-wave plate Q2, the ambient light C2 is formed into linear polarized light of the X direction, and is adapted to pass through the second polarizer P2 and the switchable scattering element 200 of the transparent state.

The ambient light C1 from the projection side of the electrically controlled optical screen 10A is propagated toward the switchable scattering element 200, and the ambient light C1 may penetrate through the switchable scattering element 200, and is formed into linear polarized light of the X direction after passing through the second polarizer P2. After passing through the second quarter-wave plate Q2, the ambient light C1 is formed into right-handed circularly polarized light, and remaining to be the right-handed circularly polarized light C1 after passing through the electrically controlled wave plate 101 (without the phase delay function), thus passing through the cholesteric liquid crystal layer 102. After passing through the first quarter-wave plate Q1, the ambient light C1 is formed into linear polarized light of the Z direction, thus passing through the first polarizer P1. Therefore, when the electrically controlled optical screen 10A is in the transparent mode, the ambient light incident from two opposite sides of the electrically controlled optical screen 10A may all pass through the electrically controlled optical screen 10A.

Figure 5:
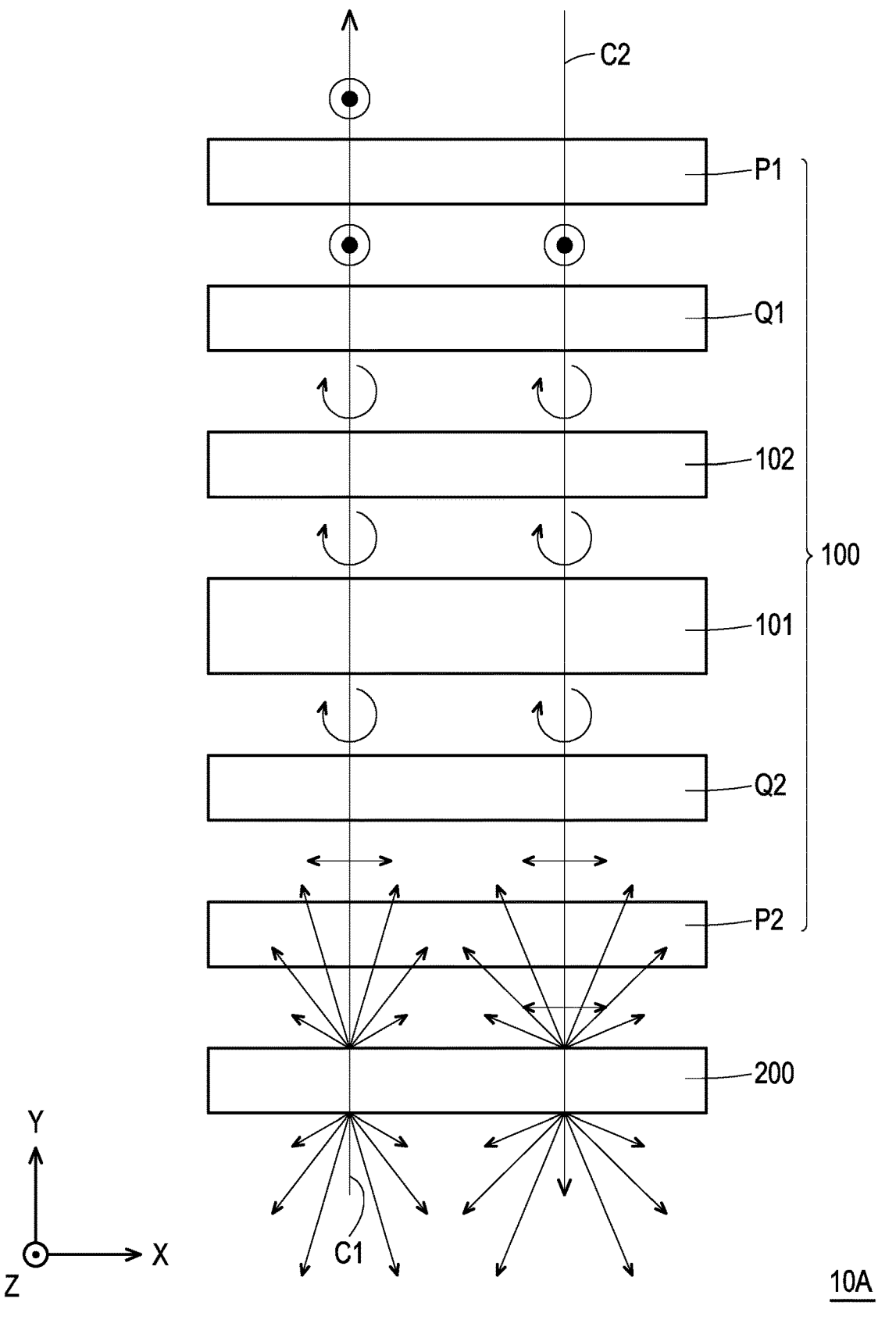
FIG. 5 is a schematic diagram of an optical mechanism of the electrically controlled optical screen in a lighting mode according to an embodiment of the invention.

Referring to FIG. 1 and FIG. 5 at the same time, FIG. 5 is a schematic diagram of an optical mechanism of the electrically controlled optical screen 10A of FIG. 1 in the lighting mode.

In the embodiment, the electrically controlled optical screen 10A is switched to the lighting mode, where the switchable scattering element 200 is configured to the scattering state, and the electrically controlled wave plate 101 is configured to have no phase delay function. A difference between the embodiment and the transparent mode shown in FIG. 4 is that both of the ambient light C1 and the ambient light C2 are scattered by the switchable scattering element 200 of the electrically controlled optical screen 10A, which achieves an anti-peeping effect.

Figure 6:
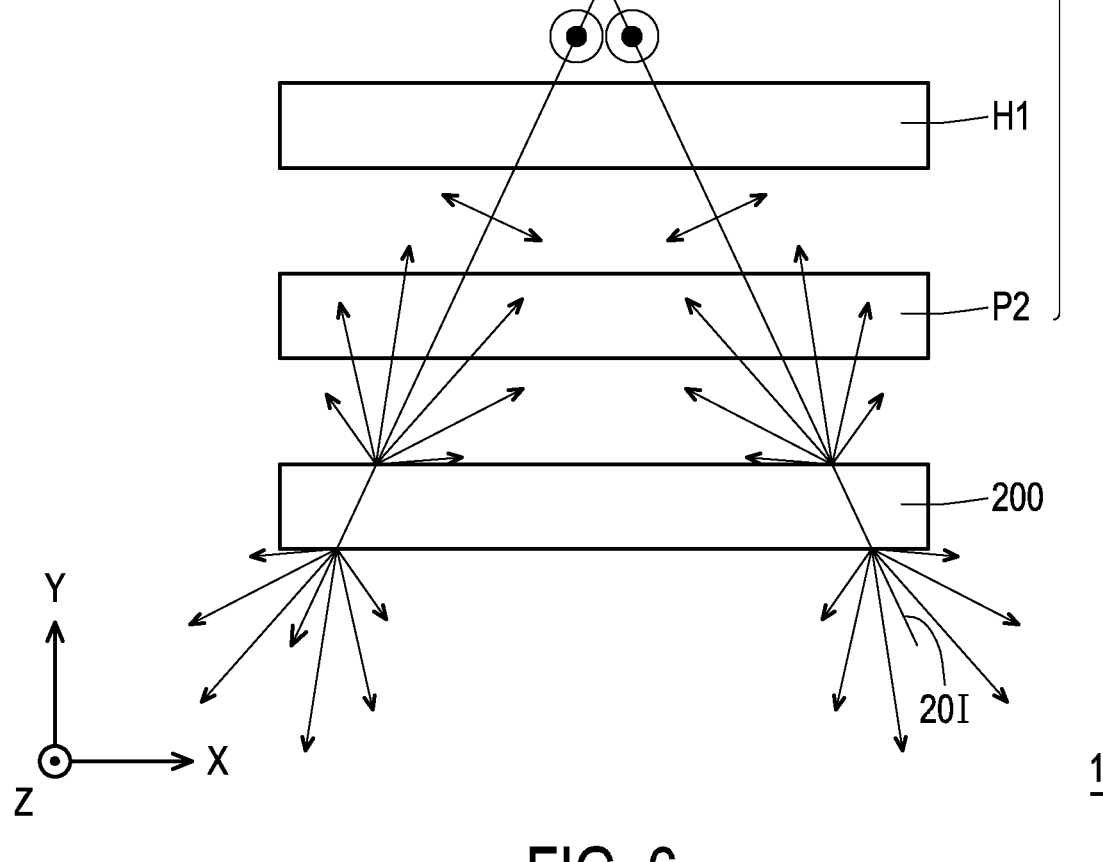
FIG. 6 is a schematic diagram of an optical mechanism of the electrically controlled optical screen in the projection mode according to an embodiment of the invention.

Referring to FIG. 6 and FIG. 2D, FIG. 6 is a schematic diagram of an electrically controlled optical screen according to an embodiment of the invention. Compared with the electrically controlled optical screen 10A, in an electrically controlled optical screen 10D, an electrically controlled decorating module 100D further includes a reflective polarizer P3 and an O-plate optical compensation film H1, where the reflective polarizer P3 is disposed between the second quarter-wave plate Q2 and the second polarizer P2, and the O-plate optical compensation film H1 is disposed between the second polarizer P2 and the reflective polarizer P3. In the embodiment, a reflection axis of the reflective polarizer P3 and a light absorption axis of the second polarizer P2 are parallel, and are both parallel to the Z direction, but the invention is not limited thereto.

Same as the embodiment shown in FIG. 2A, a part of the image light 201 may be reflected and scattered by the switchable scattering element 200 to form a projected image seen by human eyes. In addition, a part of the image light 201 passing through the switchable scattering element 200 may (at least partially) pass through the second polarizer P2 and the O-plate optical compensation film H1 to form linear polarized light of the Z direction. After the linear polarized light penetrating the O-plate optical compensation film H1 is reflected by the reflective polarizer P3, it penetrates through the optical compensation film H1 again and forms linear polarized light that may penetrate through the second polarizer P2. This linear polarized light may penetrate through the switchable scattering element 200 again, thereby effectively increasing an amount of light of the image light 201 incident to the human eyes and improving the contrast.

In some embodiments, the O-plate optical compensation film H1 may be replaced by two A-plates with optical axes perpendicular to each other or C-plates with optical axes perpendicular to each other.

It should be noted that in the embodiments of FIG. 1 to FIG. 6, the optical axis of the first quarter-wave plate Q1 and the optical axis of the second quarter-wave plate Q2 may also be perpendicular to each other, and the light absorption axis of the first polarizer P1 and the light absorption axis of the second polarizer P2 are parallel to each other. Since the optical axis of the first quarter-wave plate Q1 is perpendicular to the optical axis of the second quarter-wave plate Q2, a color deviation phenomenon will be reduced.

In some embodiments, the cholesteric liquid crystal layer 102 of the electrically controlled optical screen 10A, the electrically controlled optical screen 10B, the electrically controlled optical screen 10C and the electrically controlled optical screen 10D is right-handed cholesteric liquid crystal, and the optical axis of the first quarter-wave plate Q1 and a slow axis of the second quarter-wave plate Q2 are rotated by 90 degrees, so that the ambient light is formed into left-handed circularly polarized light after passing through the first polarizer P1 and the first quarter-wave plate Q1 or passing through the second polarizer P2 and the second quarter-wave plate Q2, and accordingly the ambient light may pass through the cholesteric liquid crystal layer 102 to hide the decorative pattern of the cholesteric liquid crystal layer 102 and make these electrically controlled optical screens to present the transparent mode.

Figure 7:
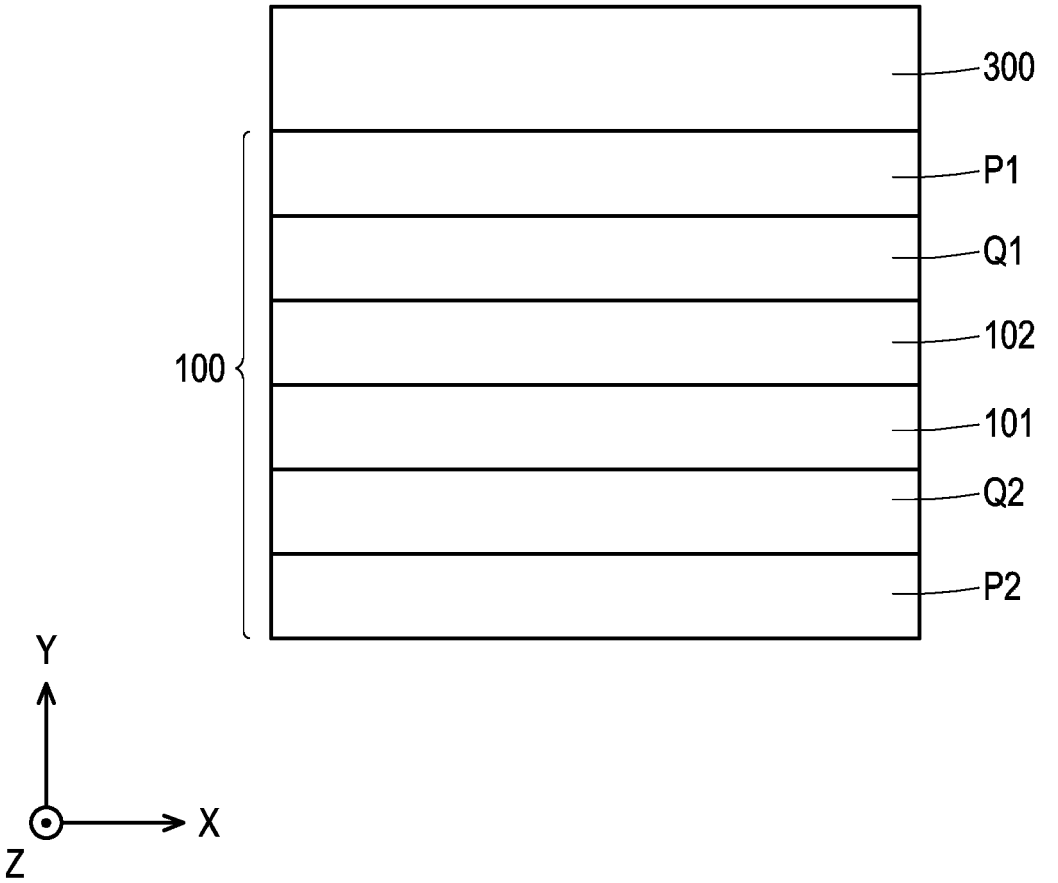
FIG. 7 is a schematic diagram of an electrically controlled optical screen according to an embodiment of the invention.

Referring to FIG. 7 and FIG. 2D, FIG. 7 is a schematic diagram of an electrically controlled optical screen according to an embodiment of the invention. An electrically controlled optical screen 10E includes a scattering element 300 and an electrically controlled decoration module 100. The scattering element 300 is disposed on one side of the electrically controlled decoration module 100, and this side is the non-projection side of the electrically controlled optical screen 10E. The electrically controlled decoration module 100 includes the first polarizer P1, the first quarter-wave plate Q1, the cholesteric liquid crystal layer 102, the electrically controlled wave plate 101, the second quarter-wave plate Q2 and the second polarizer P2, and the first polarizer P1 is located between the scattering element 300 and the first quarter-wave plate Q1. The electrically controlled wave plate 101 has a liquid crystal layer. The light absorption axis of the first polarizer P1 is perpendicular to the light absorption axis of the second polarizer P2. In the embodiment, the light absorption axis of the first polarizer P1 is parallel to the X direction, and the light absorption axis of the second polarizer P2 is parallel to the Z direction. The optical axis of the first quarter-wave plate Q1 is parallel to the optical axis of the second quarter-wave plate Q2. The cholesteric liquid crystal layer 102 is used to reflect one of the left-handed circularly polarized light and the right-handed circularly polarized light.

The electrically controlled wave plate 101 may be a liquid crystal cell using a vertical alignment (VA) technology, an electrically controlled birefringence (ECB) technology or an in-plane switching (IPS) technology. Taking the embodiment of using the vertical alignment (VA) technology as an example for description, the electrically controlled wave plate 101 may be switched between a first state and a second state through an operation of applying voltage or not applying voltage. The electrically controlled wave plate 101 acts as a half wave plate in the first state, and provides no phase delay in the second state. Based on the structure and technology of the above-mentioned electrically controlled wave plate 101, the electrically controlled optical screen 10E may be switched between different optical modes to be described below. The electrically controlled optical screen 10E may be, for example, switched between a projection mode and a decoration mode, which will be described in detail below.

Figure 8:
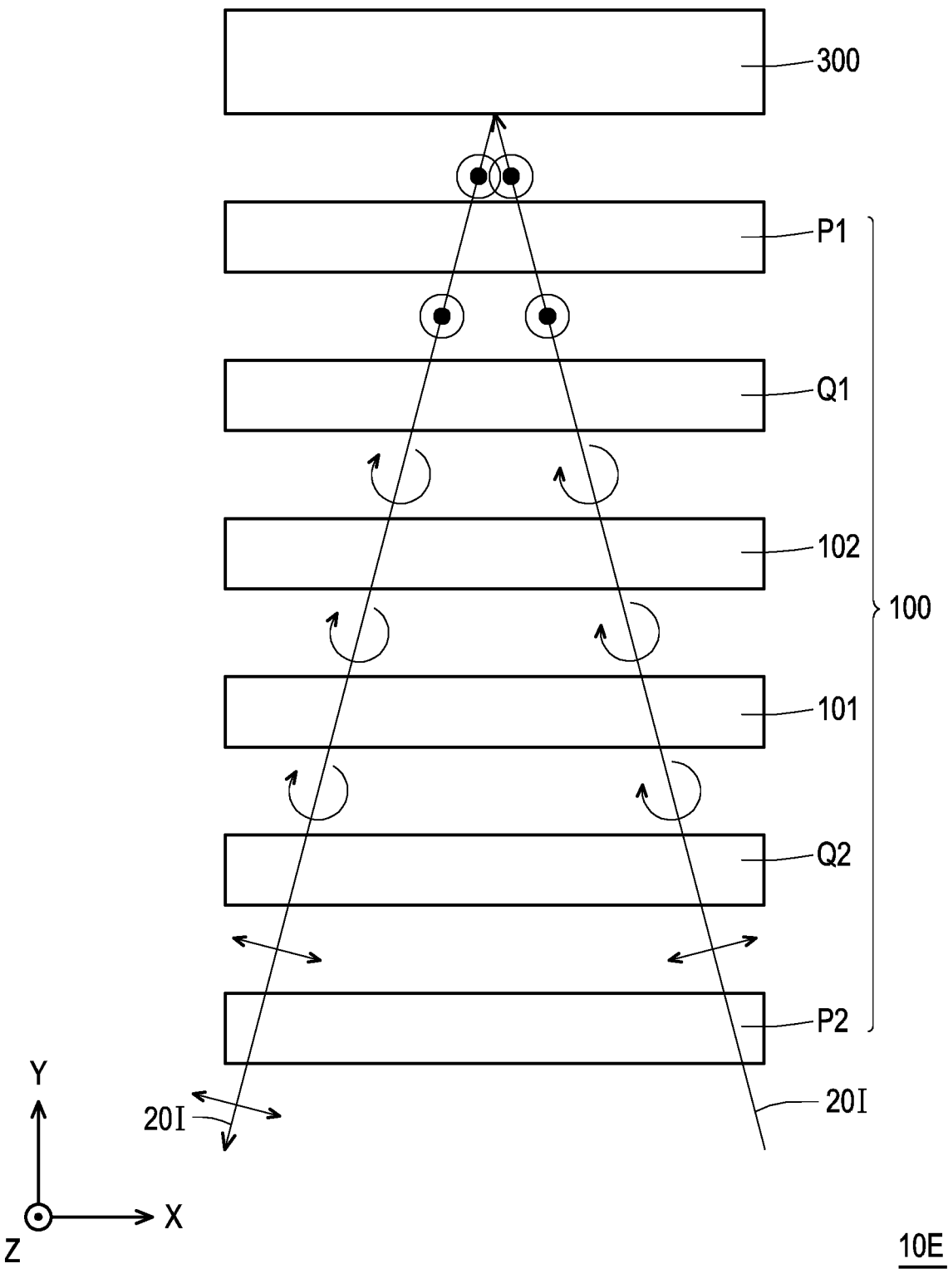
FIG. 8 is a schematic diagram of an optical mechanism of the electrically controlled optical screen in the projection mode according to an embodiment of the invention.

Referring to FIG. 2D, FIG. 7 and FIG. 8 at the same time, FIG. 8 is a schematic diagram of an optical mechanism of the electrically controlled optical screen 10E of FIG. 7 in the projection mode. In the embodiment, the projection system 1 includes the electrically controlled optical screen 10E, the projection device 20 and the reflector 30. The projection device 20 is used for providing the image light 201. After being reflected by the reflector 30, the image light 201 is projected on the electrically controlled optical screen 10E from the projection side of the electrically controlled optical screen 10E. The reflector 30 may be, for example, a reflector independently arranged or a reflector disposed within a same casing as the projection device.

In the embodiment, the electrically controlled optical screen 10E is switched to the projection mode, where the electrically controlled wave plate 101 is configured in the state, in which no phase delay is provided. The image light 201 (linear polarized light in the X direction) from the projection device 20 may pass through the second polarizer P2. After passing through the second quarter-wave plate Q2, the image light 201 is formed into right-handed circularly polarized light. Since the electrically controlled wave plate 101 does not provide phase delay, the image light 201 remains to be the right-handed circularly polarized light after penetrating through the electrically controlled wave plate 101, thus passing through the cholesteric liquid crystal layer 102. The right-handed circularly polarized light 201 is formed into linear polarized light of the Z direction after passing through the first quarter-wave plate Q1, so that it may pass through the first polarizer P1 and is further reflected and scattered by the scattering element 300. The image light 201 reflected and scattered by the scattering element 300 then sequentially passes through the first polarizer P1, the first quarter-wave plate Q1, the cholesteric liquid crystal layer 102, the electrically controlled wave plate 101, the second quarter-wave plate Q2 and the second polarizer P2 to form the image light 201 that enters the human eyes.

Figure 9:
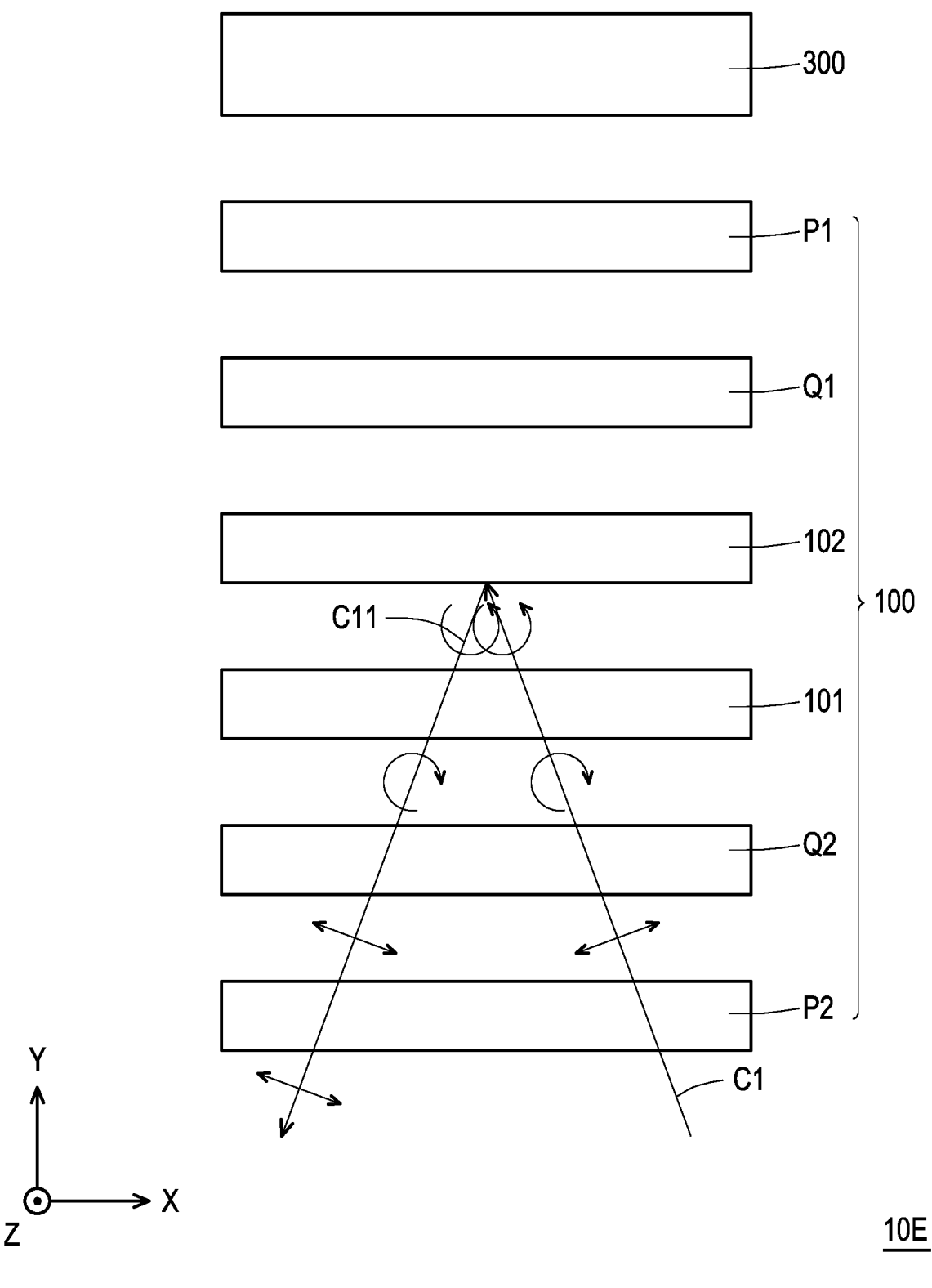
FIG. 9 is a schematic diagram of an optical mechanism of the electrically controlled optical screen in the decoration mode according to an embodiment of the invention.

Referring to FIG. 7 and FIG. 9 at the same time, FIG. 9 is a schematic diagram of an optical mechanism of the electrically controlled optical screen 10E of FIG. 7 in the decoration mode.

In the embodiment, the electrically controlled optical screen 10E is switched to the decoration mode, where the electrically controlled wave plate 101 is configured as a half-wave plate. The ambient light C1 from the projection side is formed into linear polarized light of the X direction after passing through the second polarizer P2. After passing through the second quarter-wave plate Q2, the ambient light C1 is formed into right-handed circularly polarized light, and formed into left-handed circularly polarized light C1 after passing through the electrically controlled wave plate 101 (configured as a half-wave plate). When the left-handed circularly polarized light C1 is incident on the cholesteric liquid crystal layer 102, most of it may be reflected by the cholesteric liquid crystal layer 102 to form the left-handed circularly polarized light C11, while the other part of the left-handed circularly polarized light C1 may penetrate through the cholesteric liquid crystal layer 102 (not depicted) as a wavelength thereof is deviated from a dominant wavelength corresponding to the cholesteric liquid crystal molecules. The left-handed circularly polarized light passing through the cholesteric liquid crystal layer 102 is formed into linear polarized light of the X direction after passing through the first quarter-wave plate Q1, and is absorbed by the first polarizer P1 (not depicted).

After being reflected by the cholesteric liquid crystal layer 102, the left-handed circularly polarized light C11 is formed into right-handed circularly polarized light C11 after passing through the electrically controlled wave plate 101 (configured as a half-wave plate). After passing through the second quarter-wave plate Q2, the right-handed circularly polarized light C11 is formed into linear polarized light of the X direction and passes through the second polarizer P2, so that human eyes may see the decorative pattern of the cholesteric liquid crystal layer 102.

Figure 10:
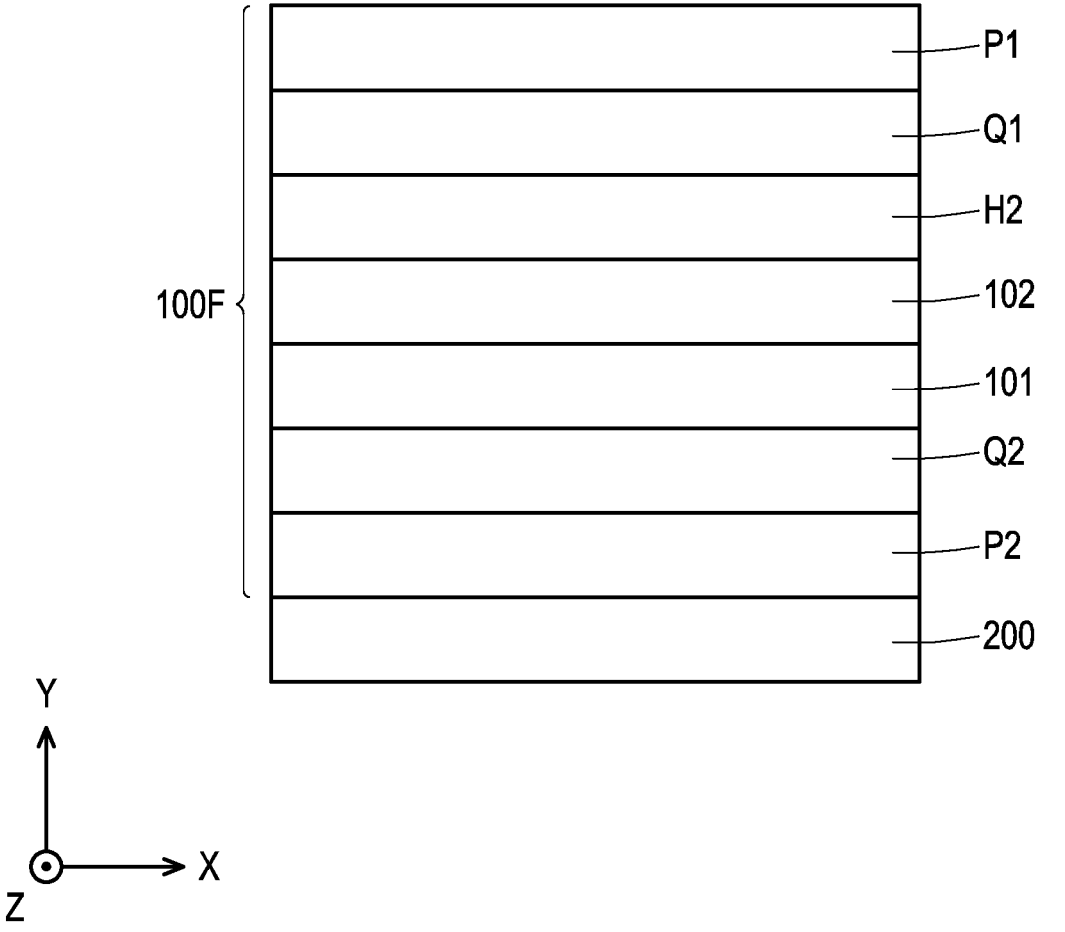
FIG. 10 is a schematic diagram of an electrically controlled optical screen according to an embodiment of the invention.

Referring to FIG. 10 and FIG. 2D, FIG. 10 is a schematic diagram of an electrically controlled optical screen according to an embodiment of the invention. The electrically controlled optical screen 10F includes a switchable scattering element 200 and an electrically controlled decorating module 100F. Compared with the electrically controlled optical screen 10A shown in FIG. 1, the electrically controlled decorating module 100F of the electrically controlled optical screen 10F includes the compensation film H2. The compensation film H2 is disposed between the first quarter-wave plate Q1 and the second quarter-wave plate Q2, so as to compensate the out-of-plane retardation (Rth) of the cholesteric liquid crystal layer.

Specifically, since the cholesteric liquid crystal has the out-of-plane retardation, the phase delay provided by the cholesteric liquid crystal layer 102 may vary according to the incident angle and wavelength of the incident light. After penetrating through the cholesteric liquid crystal layer 102, light beams of different incident angles and/or different wavelengths are absorbed by the first polarizer P1 and the second polarizer P2 with different ratio of absorption. In this manner, colors of the light beams penetrating through the electrically controlled optical screen 10F deviate from the original colors. Therefore, the compensation film H2 is disposed in the present embodiment to compensate the out-of-plane retardation of the cholesteric liquid crystal layer 102, such that the above-mentioned color deviation phenomenon is eliminated.

In accordance with some embodiments of the invention, when a sum of the out-of-plane retardation of the compensation film H2 and the out-of-plane retardation of the cholesteric liquid crystal layer 102 is smaller than 100 nm, the electrically controlled optical screen 10F has a superior color performance. When the sum is smaller than 50 nm, the electrically controlled optical screen 10F has a far superior color performance.

In accordance with some embodiments of the invention, the compensation film H2 may be a C-plate (such as a positive C-plate) or an O-plate, etc. The out-of-plane retardation of the compensation film H2 may cancel out the out-of-plane retardation of the cholesteric liquid crystal layer 102. In accordance with some embodiments of the invention, the cholesteric liquid crystal layer 102 has a decorative pattern, and the pattern of the compensation film H2 and the decorative pattern of the cholesteric liquid crystal layer 102 are the same and overlap with each other. If the two patterns are not the same or if the two patterns do not overlap with each other, the out-of-plane retardation of the compensation film H2 and the out-of-plane retardation of the cholesteric liquid crystal layer 102 cannot cancel each other out.

In accordance with some embodiments of the invention, When the out-of-plane retardation of the first quarter-wave plate Q1 and the out-of-plane retardation of the second quarter-wave plate Q2 are taken into consideration, and a sum of the out-of-plane retardation of the compensation film H2, the out-of-plane retardation of the cholesteric liquid crystal layer 102, the out-of-plane retardation of the first quarter-wave plate Q1 and the out-of-plane retardation of the second quarter-wave plate Q2 is smaller than 100 nm, the electrically controlled optical screen 10F has a superior color performance. When the sum is smaller than 50 nm, the electrically controlled optical screen 10F has a far superior color performance.

In accordance with some embodiments of the invention, the cholesteric liquid crystal layer 102 has a decorative pattern, and the pattern of the compensation film H2, the pattern of the first quarter-wave plate Q1, the pattern of the second quarter-wave plate Q2 and the decorative pattern of the cholesteric liquid crystal layer 102 are the same and overlap with each other. If the four patterns are not the same or if the four patterns do not overlap with each other, the out-of-plane retardation of the compensation film H2, the out-of-plane retardation of the first quarter-wave plate Q1, the out-of-plane retardation of the second quarter-wave plate Q2, and the out-of-plane retardation of the cholesteric liquid crystal layer 102 cannot cancel each other out.

Figure 11:
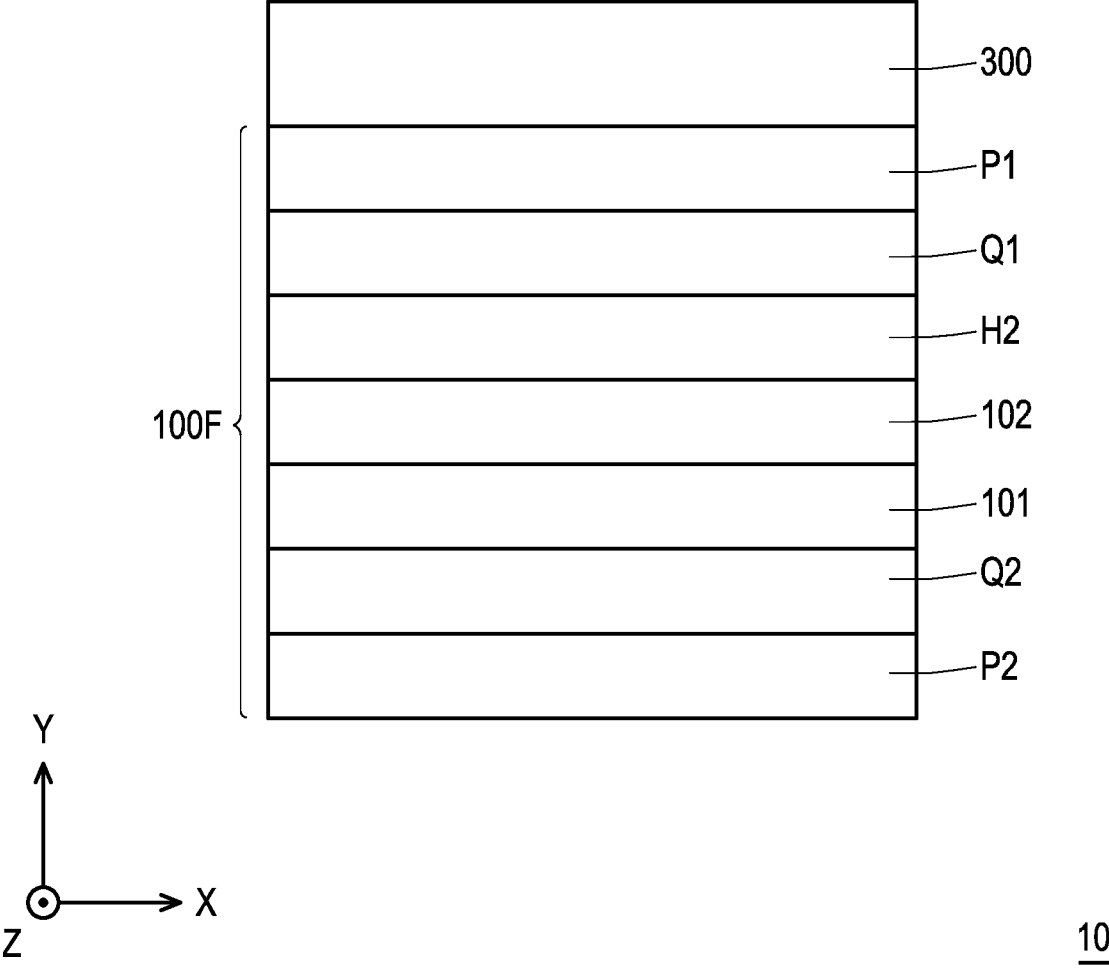
FIG. 11 is a schematic diagram of an electrically controlled optical screen according to an embodiment of the invention.

Referring to FIG. 11 and FIG. 2D, FIG. 11 is a schematic diagram of an electrically controlled optical screen according to an embodiment of the invention. The electrically controlled optical screen 10G includes a scattering element 300 and an electrically controlled decoration module 100F. The scattering element 300 is disposed on one side of the electrically controlled decoration module 100F, and this side is the non-projection side of the electrically controlled optical screen 10G. Compared with the electrically controlled optical screen 10E shown in FIG. 7, the electrically controlled decoration module 100F of the electrically controlled optical screen 10G includes the compensation film H2, so as to compensate the out-of-plane retardation of the cholesteric liquid crystal layer 102, or further, to compensate the out-of-plane retardation of the first quarter-wave plate Q1 and the out-of-plane retardation of the second quarter-wave plate Q2. The compensation mechanism of the electrically controlled optical screen 10G is similar to the compensation mechanism of the electrically controlled optical screen 10F described above. Redundant description is omitted.

Figure 12:
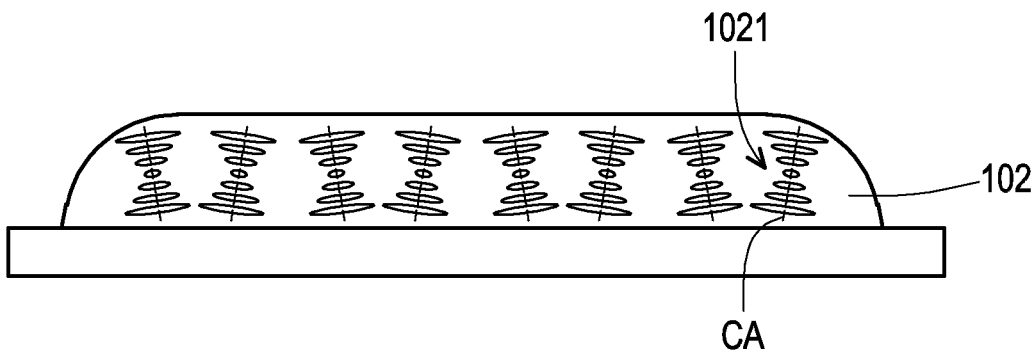
FIG. 12 is a schematic diagram of the cholesteric liquid crystal layer according to an embodiment of the invention.
Figure 13:
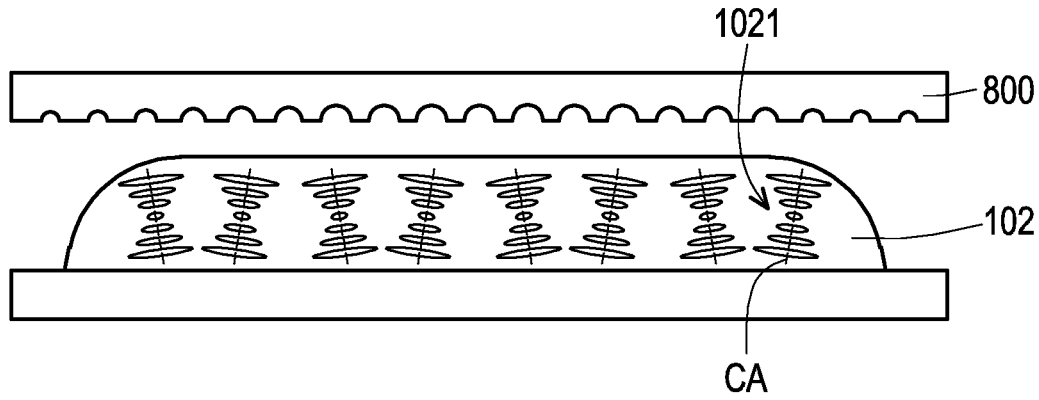
FIG. 13 is a schematic diagram of the manufacture of the cholesteric liquid crystal layer according to an embodiment of the invention.

Referring to FIG. 12 and FIG. 13, FIG. 12 is a schematic diagram of the cholesteric liquid crystal layer according to an embodiment of the invention and FIG. 13 is a schematic diagram of the manufacture of the cholesteric liquid crystal layer according to an embodiment of the invention.

As shown in FIG. 13, in the process for manufacturing the cholesteric liquid crystal layer 102, by controlling depth of the holes in different regions of the platen 800, the thickness of the cholesteric liquid crystal layer 102 may gradually decreases at the edge, wherein the edge of the cholesteric liquid crystal layer 102 corresponds to the holes having lower depth. In this manner, the pattern outline issue in the transparent mode caused by the level difference at the edge of the cholesteric liquid crystal layer 102 may be mended or eliminated.

As shown in FIG. 12 and FIG. 13, in the embodiments of the invention, the cholesteric liquid crystal layer 102 includes a plurality of cholesteric liquid crystal molecules 1021. Each cholesteric liquid crystal molecule 1021 forms of a helical structure and has a helical axis CA, wherein each helical axis CA is not parallel to the normal of the cholesteric liquid crystal layer 102. In some embodiments, each included angle between the individual helical axis CA and the normal of the cholesteric liquid crystal layer 102 is within a range of −45 degree to 45 degree. In some preferable embodiments, each included angle between the individual helical axis CA and the normal of the cholesteric liquid crystal layer 102 is within a range of −30 degree to 30 degree. In some far preferable embodiments, each included angle between the individual helical axis CA and the normal of the cholesteric liquid crystal layer 102 is within a range of −10 degree to 10 degree. By disposing each of the helical axis CA to be inclined relative to the normal of the cholesteric liquid crystal layer 102, the blue shift issue of the cholesteric liquid crystal layer 102 at large viewing angles is effectively mended.

In summary, the electrically controlled optical screen provided by the embodiment of the invention has the switchable scattering element and the electrically controlled decorating module, and is suitable for switching between different optical modes. More specifically, the switchable scattering element may be switched between the scattering state and the transparent state, and may be combined with the electrically controlled wave plate in the electrically controlled decorating module to generate various optical modes. The various optical modes of the electrically controlled optical screen provide users with different visual experiences. When the electrically controlled optical screen is configured to a projection mode, visible brightness and contrast may be effectively improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An electrically controlled optical screen, adapted to be switched between different optical modes and comprising: a switchable scattering element and an electrically controlled decorating module, wherein, the switchable scattering element is disposed on one side of the electrically controlled decorating module and is configured to switch between a scattering state and a transparent state, the electrically controlled decorating module comprises a first polarizer, a first quarter-wave plate, a cholesteric liquid crystal layer, an electrically controlled wave plate, a second quarter-wave plate and a second polarizer stacked in sequence, and wherein the electrically controlled wave plate has a liquid crystal layer, the second polarizer is disposed between the switchable scattering element and the second quarter-wave plate, the cholesteric liquid crystal layer is configured to reflect one of left-handed circularly polarized light or right-handed circularly polarized light, wherein a light absorption axis of the first polarizer is perpendicular to a light absorption axis of the second polarizer, and an optical axis of the first quarter-wave plate is parallel to an optical axis of the second quarter-wave plate, or wherein the light absorption axis of the first polarizer is parallel to the light absorption axis of the second polarizer, and the optical axis of the first quarter-wave plate is perpendicular to the optical axis of the second quarter-wave plate.

2. The electrically controlled optical screen as claimed in claim 1, wherein the switchable scattering element comprises a liquid crystal layer.

3. The electrically controlled optical screen as claimed in claim 1, wherein the electrically controlled wave plate is one of a liquid crystal cell of a vertical alignment mode, a liquid crystal cell of an electrically controlled birefringence (ECB) mode, and a liquid crystal cell of an in-plane switching (IPS) mode.

4. The electrically controlled optical screen as claimed in claim 1, wherein when the electrically controlled optical screen is switched to a projection mode, the switchable scattering element is configured as the scattering state and the electrically controlled wave plate is configured as a half-wave plate.

5. The electrically controlled optical screen as claimed in claim 4, wherein when the electrically controlled optical screen is in the projection mode, the electrically controlled optical screen receives image light, and the switchable scattering element is configured to scatter the image light.

6. The electrically controlled optical screen as claimed in claim 4, further comprising a Fresnel lens layer, and the Fresnel lens layer comprising a transflective layer, wherein the transflective layer is disposed on at least a part of a surface of the Fresnel lens layer away from the switchable scattering element.

7. The electrically controlled optical screen as claimed in claim 4, further comprising a prism layer, and the prism layer comprising a reflective layer, wherein the reflective layer is disposed on at least part of a surface of the prism layer away from the switchable scattering element.

8. The electrically controlled optical screen as claimed in claim 1, wherein when the electrically controlled optical screen is switched to a decoration mode, the switchable scattering element is configured as the transparent state, and the electrically controlled wave plate is configured as a half-wave plate.

9. The electrically controlled optical screen as claimed in claim 1, wherein when the electrically controlled optical screen is switched to a transparent mode, the switchable scattering element is configured to the transparent state, and the electrically controlled wave plate is configured to have no phase delay function.

10. The electrically controlled optical screen as claimed in claim 1, wherein when the electrically controlled optical screen is switched to a lighting mode, the switchable scattering element is configured to the scattering state and the electrically controlled wave plate is configured to have no phase delay function.

11. The electrically controlled optical screen as claimed in claim 1, further comprising a reflective polarizer and an O-plate optical compensation film, wherein the reflective polarizer is disposed between the second quarter-wave plate and the second polarizer, and the O-plate optical compensation film is disposed between the second polarizer and the reflective polarizer.

12. The electrically controlled optical screen as claimed in claim 11, wherein a reflection axis of the reflective polarizer is parallel to the light absorption axis of the second polarizer.

13. The electrically controlled optical screen as claimed in claim 1, wherein the electrically controlled decorating module further includes a compensation film, the compensation film is disposed between the first quarter-wave plate and the second quarter-wave plate to compensate out-of-plane retardation of the cholesteric liquid crystal layer.

14. The electrically controlled optical screen as claimed in claim 13, wherein a sum of out-of-plane retardation of the compensation film, the out-of-plane retardation of the cholesteric liquid crystal layer, out-of-plane retardation of the first quarter-wave plate and out-of-plane retardation of the second quarter-wave plate is smaller than 100 nm.

15. The electrically controlled optical screen as claimed in claim 13, wherein the cholesteric liquid crystal layer has a decorative pattern, and a pattern of the compensation film and the decorative pattern of the cholesteric liquid crystal layer are the same.

16. The electrically controlled optical screen as claimed in claim 15, wherein a pattern of the first quarter-wave plate and a pattern of the second quarter-wave plate are the same with the decorative pattern of the cholesteric liquid crystal layer.

17. The electrically controlled optical screen as claimed in claim 1, wherein a thickness of the cholesteric liquid crystal layer gradually decreases at an edge.

18. The electrically controlled optical screen as claimed in claim 1, wherein the cholesteric liquid crystal layer includes a plurality of cholesteric liquid crystal molecules, each of the cholesteric liquid crystal molecules forms of a helical structure and each of the helical structures has a helical axis, wherein each of the helical axes is not parallel to a normal of the cholesteric liquid crystal layer.

19. The electrically controlled optical screen as claimed in claim 18, wherein included angles between the helical axes of the helical structures and the normal of the cholesteric liquid crystal layer are within a range of −45 degree to 45 degree.

* * * * *